(12) United States Patent
Matsuoka

(10) Patent No.: US 10,677,334 B2
(45) Date of Patent: Jun. 9, 2020

(54) TORQUE CONVERTER

(71) Applicant: EXEDY Corporation, Neyagawa-shi, Osaka (JP)

(72) Inventor: Yoshihiro Matsuoka, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/317,150

(22) PCT Filed: Sep. 4, 2017

(86) PCT No.: PCT/JP2017/031769
§ 371 (c)(1),
(2) Date: Jan. 11, 2019

(87) PCT Pub. No.: WO2018/061641
PCT Pub. Date: Apr. 5, 2018

(65) Prior Publication Data
US 2019/0234501 A1    Aug. 1, 2019

(30) Foreign Application Priority Data
Sep. 30, 2016   (JP) .................................. 2016-193033

(51) Int. Cl.
*F16H 45/02*   (2006.01)

(52) U.S. Cl.
CPC ..... *F16H 45/02* (2013.01); *F16H 2045/0205* (2013.01); *F16H 2045/0226* (2013.01); *F16H 2045/0278* (2013.01)

(58) Field of Classification Search
CPC ............. F16H 45/02; F16H 2045/0278; F16H 2045/0226; F16H 2045/0205
See application file for complete search history.

(56) References Cited

U.S. PATENT DOCUMENTS 5,195,621 A * 3/1993 Dull ........................ F16H 45/02
                                                        192/3.29
5,388,678 A   2/1995 Murata
(Continued)

FOREIGN PATENT DOCUMENTS

CN    102177368 A    9/2011
EP    577389 A2    1/1994
(Continued)

OTHER PUBLICATIONS

International Search Report dated Oct. 3, 2017 for corresponding foreign Application No. PCT/JP2017/031769, pp. 2.

*Primary Examiner* — David J Hlavka
(74) *Attorney, Agent, or Firm* — United IP Counselors, LLC

(57) ABSTRACT

A torque converter for transmitting torque to an input shaft of a transmission includes a front cover, an impeller, a turbine disposed in opposition to the impeller, and a lock-up device. The lock-up device is for mechanically transmitting torque from the front cover to the turbine. The lock-up device includes a pressure receiving portion, a piston and an input part. The pressure receiving portion has an annular shape and is provided to protrude from an outer peripheral end of the turbine further radially outward. The piston is disposed between the front cover and the turbine so as to be axially movable, and includes a friction portion in an outer peripheral part thereof. The friction portion is capable of being engaged by friction with the pressure receiving portion of the turbine when pressed onto the pressure receiving portion. The input part transmits the torque from the front cover to the piston.

11 Claims, 5 Drawing Sheets

(56) References Cited

U.S. PATENT DOCUMENTS

| | | | |
|---|---|---|---|
| 5,636,718 A | 6/1997 | Nomoto et al. | |
| 5,669,475 A * | 9/1997 | Matsuoka | F16H 45/02 192/3.29 |
| 5,806,639 A | 9/1998 | Nomoto et al. | |
| 6,648,112 B2 * | 11/2003 | Suzuki | F16H 45/02 192/212 |
| 7,980,992 B2 * | 7/2011 | Sturgin | F16D 25/10 192/3.26 |
| 2007/0074943 A1 * | 4/2007 | Hemphill | F16H 45/02 192/3.25 |
| 2008/0149442 A1 * | 6/2008 | Sturgin | F16H 45/02 192/3.26 |
| 2011/0099992 A1 * | 5/2011 | Magerkurth | F16F 15/145 60/435 |
| 2011/0192691 A1 | 8/2011 | Murata et al. | |
| 2014/0097055 A1 * | 4/2014 | Lindemann | F16H 45/02 192/3.21 |
| 2015/0027111 A1 * | 1/2015 | Steinberger | F16D 33/18 60/338 |
| 2018/0051785 A1 * | 2/2018 | Gradolph | F16H 45/02 |

FOREIGN PATENT DOCUMENTS

| | | |
|---|---|---|
| EP | 660012 A2 | 6/1995 |
| JP | 58-106659 U | 7/1983 |
| JP | 06-017905 A | 1/1994 |
| JP | 07-190168 A | 7/1995 |
| JP | 2010-053963 A | 3/2010 |
| JP | 2010-091099 A | 4/2010 |
| JP | 2010-139001 A | 6/2010 |
| WO | 2010/041137 A1 | 4/2010 |

* cited by examiner

TORQUE CONVERTER

CROSS-REFERENCES TO RELATED APPLICATIONS

This application is the U.S. National Phase of PCT International Application No. PCT/JP2017/031769, filed on Sep. 4, 2017. That application claims priority to Japanese Patent Application No. 2016-193033, filed Sep. 30, 2016. The contents of both applications are herein incorporated by reference in their entirety.

TECHNICAL FIELD

The present disclosure relates to a torque converter, particularly to a torque converter transmitting a torque from a drive source to an input shaft of a transmission.

BACKGROUND ART

A torque converter includes an impeller and a turbine, and transmits a torque from the impeller to the turbine through hydraulic oil contained in the interior thereof. The impeller is fixed to a front cover to which the torque is inputted from an engine. The turbine is disposed in opposition to the impeller within a fluid chamber. When the impeller is rotated, the hydraulic oil flows from the impeller to the turbine. The flow of the hydraulic oil rotates the turbine, whereby the torque is outputted.

Additionally, the torque converter includes a lock-up device. The lock-up device includes a piston. When the lock-up device is turned on, the piston is engaged with the front cover. As a result, the torque from the front cover is inputted to the piston. The torque is mechanically transmitted to the turbine from the piston, and is then outputted therefrom to an input shaft of a transmission.

For example, a torque converter described in Japan Laid-open Patent Application Publication No. 2010-53963 is provided with a clutch part in the outer peripheral part of a turbine shell. The clutch part is composed of a coupling member, a friction block and a piston. The coupling member and the friction block are provided on the turbine side. The piston is provided with a friction member fixed to the outer peripheral part thereof, and is axially movable. Additionally, when the piston is moved to the turbine side and thereby the friction member is pressed onto the friction block, a lock-up on state (a torque transmission allowed state) is made.

BRIEF SUMMARY

The torque converter described in Japan Laid-open Patent Application Publication No. 2010-53963 has a large number of components, and the clutch part in particular has a complex configuration. Additionally, it is difficult to increase the torque transmission capacity of the clutch part.

It is an object of the present disclosure that a lock-up device for a torque converter can be realized with a simple configuration and a sufficient torque transmission capacity can be reliably obtained.

Solution to Problems (1) A torque converter according to the present disclosure is configured to transmit a torque from a drive source to an input shaft of a transmission. The torque converter includes a front cover to which the torque is inputted, an impeller, a turbine and a lock-up device. The impeller is fixed at an outer peripheral part thereof to an outer peripheral part of the front cover, and forms a fluid chamber together with the front cover. The turbine is disposed in opposition to the impeller and is coupled at an inner peripheral part thereof to the input shaft of the transmission. The lock-up device mechanically transmits the torque from the front cover to the turbine.

Additionally, the lock-up device includes a pressure receiving portion having an annular shape, a piston and an input part. The annular pressure receiving portion is provided to protrude from an outer peripheral end of the turbine further radially outward. The piston is disposed between the front cover and the turbine so as to be axially movable, and includes a friction portion in an outer peripheral part thereof, and the friction portion is capable of being engaged by friction with the pressure receiving portion of the turbine when pressed onto the pressure receiving portion. The input part transmits the torque from the front cover to the piston.

In the present torque converter, when the lock-up device is in a torque transmission allowed state (hereinafter referred to as "a lock-up on state" or "a clutch-on state"), the piston has been axially moved and is being pressed at the friction portion thereof onto the pressure receiving portion of the turbine. Therefore, a torque, inputted to the piston from the front cover, is transmitted therefrom to the turbine and is then outputted therefrom to the input shaft of the transmission.

A clutch part is herein composed of the friction portion provided in the outer peripheral part of the piston and the pressure receiving portion provided in the outer peripheral end of the turbine. Hence, the configuration thereof is made quite simple. Additionally, the lock-up on state can be made only by moving the piston. Hence, good responsiveness is obtained when the clutch-on state is made.

Moreover, the clutch part is provided on the further outer peripheral side of the outer peripheral end of the turbine. Hence, a large torque transmission capacity can be reliably obtained. By contrast, when the torque transmission capacity is set constant, a friction area can be made small. Furthermore, the outer peripheral part of the torque converter can be expanded in space. Hence, in installing therein a damper mechanism, the damper mechanism can be produced with sufficient torque transmission capacity and good vibration absorbing performance.

(2) Preferably, the turbine includes a turbine shell, and the pressure receiving portion is formed by extending an outer peripheral end of the turbine shell radially outward.

In this case, the pressure receiving portion can be formed by utilizing part of the turbine shell. Hence, manufacturing cost can be reduced as much as possible.

(3) Preferably, the torque converter further includes a guide member having an annular shape. The guide member is provided in an outer peripheral part of the pressure receiving portion and extends toward the front cover on an outer peripheral side of the piston. The guide member leads a hydraulic oil supplied to an interior of the fluid chamber to a front cover side of the piston.

In this case, the hydraulic oil is well led to the front cover side that is the rear side of the piston. Because of this, clutch responsiveness can be further enhanced. Additionally, lubricating performance is also enhanced.

(4) Preferably, the guide member extends at a distal end thereof toward the front cover across an outer peripheral surface of the piston set in a neutral position. The neutral position corresponds to a position of the piston not moved toward the pressure receiving portion.

In this case, the hydraulic oil can be reliably led to the rear side of the piston by the guide member. Therefore, responsiveness is reliably enhanced.

(5) Preferably, the guide member is formed by bending the outer peripheral part of the pressure receiving portion toward the front cover. In this case, the guide member can be formed by utilizing part of the pressure receiving portion. Hence, manufacturing cost can be further reduced.

(6) Preferably, the input part includes a drive plate rotated in synchronization with the front cover, a driven plate rotated in synchronization with the piston, and a plurality of elastic members elastically coupling the drive plate and the driven plate in a rotational direction.

In this case, the input part is configured to exert a damper function. Therefore, fluctuations in torque to be transmitted can be absorbed and attenuated.

(7) Preferably, the drive plate is fixed to the front cover, and includes a holding portion holding the plurality of elastic members. Additionally, the driven plate is fixed to the piston, and includes an engaging portion engaged with the plurality of elastic members.

(8) Preferably, the piston includes a communication hole making a space located on the front cover side of the piston and a space located on a turbine side of the piston.

In this case, the hydraulic oil, residing on the rear side of the piston, can be circulated through the communication hole. Because of this, lubricating performance is enhanced.

(9) Preferably, the communication hole is provided on a radially inner side of a torus formed by the impeller and the turbine. In this case, circulation performance is enhanced.

(10) Preferably, the torque converter further includes a check valve that is mounted to the turbine and allows only a flow of the hydraulic oil from a space located on a piston side of the turbine to a space located on an impeller side of the turbine.

Here, in lock-up actuation, the interior of the fluid chamber is lowered in pressure. Therefore, the hydraulic oil residing in the space between the turbine and the piston can be actively led to the interior of the turbine by utilizing difference in pressure between both sides of the turbine. Because of this, pressure can be reliably lowered on the turbine side of the piston than on the rear side of the piston, whereby clutch responsiveness can be further enhanced.

On the other hand, in the initial phase of lock-up actuation and torque converter actuation (when a torque is transmitted through a fluid), the check valve prevents the hydraulic oil in the interior of the fluid chamber from flowing out of the turbine toward the piston. Because of this, the piston can be quickly moved toward the turbine in the initial phase of lock-up actuation. Additionally, deterioration in characteristics of the torque converter can be avoided.

(11) Preferably, the torque converter further includes a dynamic vibration absorber fixed to the piston. In this case, fluctuations in torque to be transmitted can be further inhibited.

According to the present disclosure, a lock-up device for a torque converter can be realized with a simple configuration, and a sufficient torque transmission capacity can be reliably obtained.

DETAILED DESCRIPTION OF EMBODIMENTS

[Entire Configuration]

Figure 1:
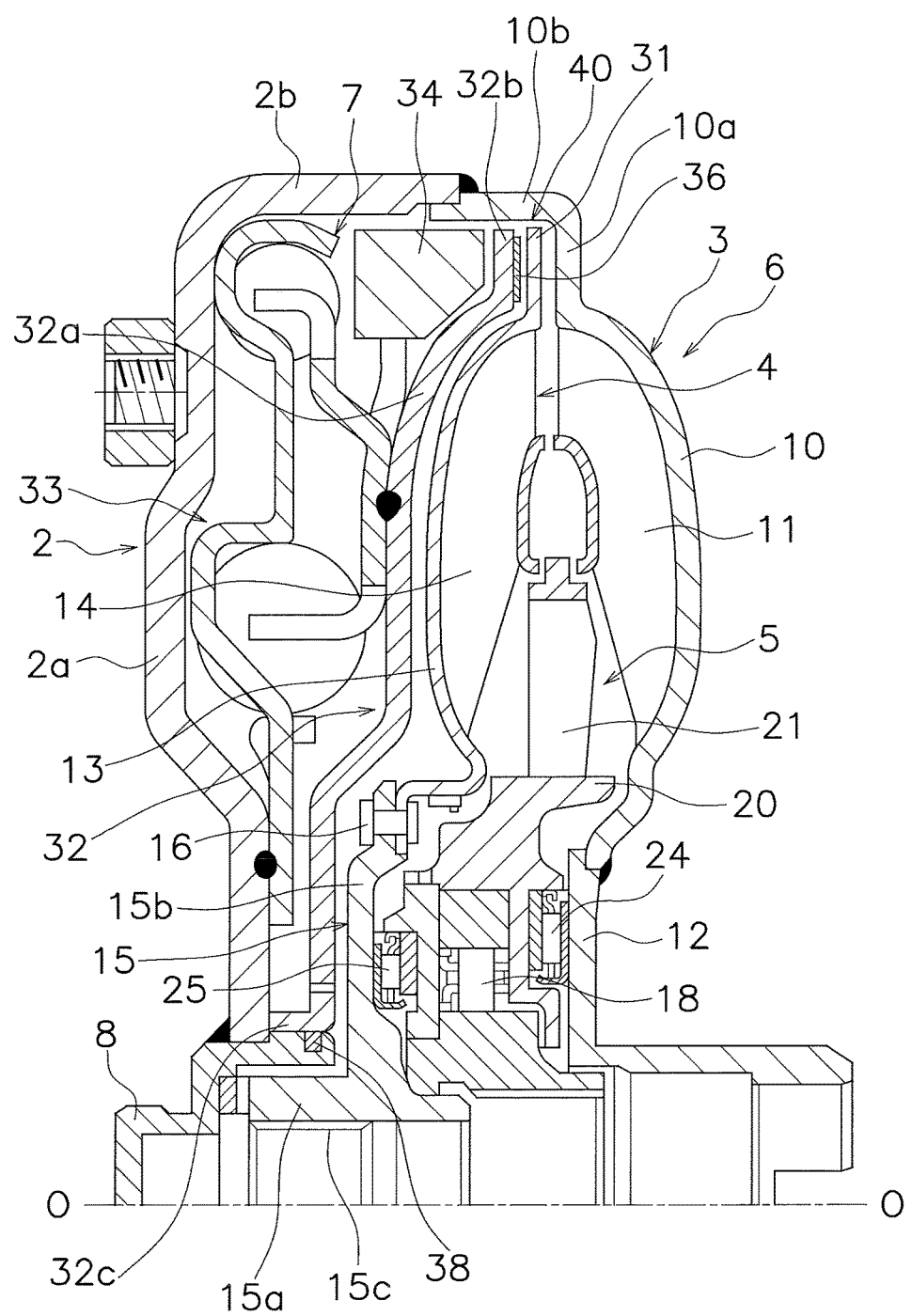
FIG. 1 is a cross-sectional view of a torque converter according to an exemplary embodiment of the present disclosure.
Figure 2:
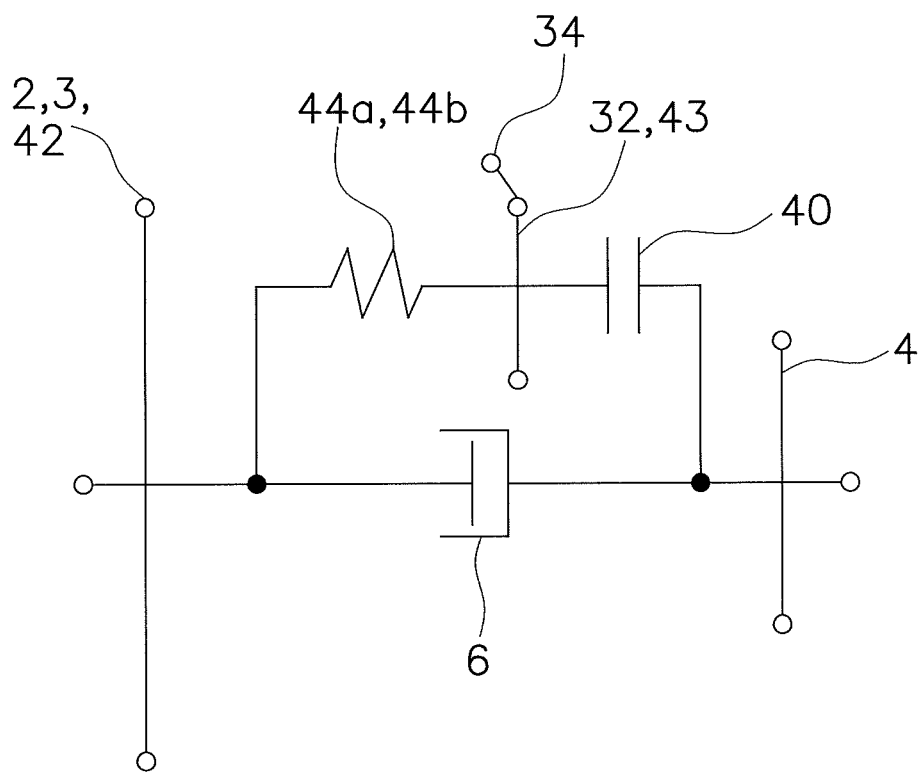
FIG. 2 is a schematic diagram of the torque converter shown in FIG. 1.

FIG. 1 is a cross-sectional view of a torque converter 1 according to an exemplary embodiment of the present disclosure. On the other hand, FIG. 2 is a schematic diagram of the torque converter 1. In the following explanation, the term "axial direction" means an extending direction of a rotational axis O of a torque converter 1. It should be noted that an engine is disposed on the left side in FIG. 1 whereas a transmission is disposed on the right side in FIG. 1, although the engine and the transmission are not shown in FIG. 1.

The torque converter 1 is rotatable about the rotational axis O, and includes a front cover 2, a torque converter body 6 composed of an impeller 3, a turbine 4 and a stator 5, and a lock-up device 7.

[Front Cover 2]

A torque is inputted to the front cover 2 from the engine. The front cover 2 includes a disc portion 2a and a tubular portion 2b. A hub 8 having a cylindrical shape is fixed to the inner peripheral part of the disc portion 2a by welding. The tubular portion 2b extends axially toward the impeller 3 from the outer peripheral end of the disc portion 2a.

[Impeller 3]

The impeller 3 includes an impeller shell 10, a plurality of impeller blades 11 and an impeller hub 12. The impeller shell 10 includes a flat plate portion 10a and a tubular portion 10b in the outer peripheral part thereof. The flat plate portion 10a is a flat portion extending to be approximately orthogonal to the rotational axis O. On the other hand, the tubular portion 10b is a portion shaped to extend toward the front cover 2 from the outer peripheral end of the flat plate portion 10a. The distal end of the tubular portion 10b is fixed to that of the tubular portion 2b of the front cover 2 by welding. The front cover 2 and the impeller shell 10 compose the outer shell of the torque converter 1. The impeller blades 11 are fixed to the inner peripheral surface of the impeller shell 10. The impeller hub 12 is fixed to the inner peripheral part of the impeller shell 10 by welding.

[Turbine 4]

The turbine 4 is disposed in opposition to the impeller 3. The turbine 4 includes a turbine shell 13 and a plurality of turbine blades 14. A turbine hub 15 is fixed to the inner peripheral part of the turbine shell 13 by at least one rivet 16. The turbine hub 15 includes a tubular portion 15a and a flange 15b shaped to protrude from the outer peripheral surface of the tubular portion 15a to the outer peripheral side. The tubular portion 15a is provided with a spline hole 15c on the inner peripheral surface thereof. The spline hole 15c is capable of being spline-coupled to an input shaft of the transmission. The turbine blades 14 are fixed to the inner surface of the turbine shell 13 by brazing.

[Stator 5]

The stator 5 is configured to regulate the flow of hydraulic oil returning from the turbine 4 to the impeller 3. The stator 5 is rotatable about the rotational axis O. Detailedly, the stator 5 is supported by a stationary shaft (not shown in the drawings) through a one-way clutch 18. The stator 5 is disposed between the impeller 3 and the turbine 4. The stator 5 includes a stator carrier 20 having a disc shape and a plurality of stator blades 21 attached to the outer peripheral surface of the stator carrier 20. It should be noted that a first thrust bearing 24 is disposed between the stator carrier 20 and the impeller hub 12, whereas a second thrust bearing 25 is disposed between the stator carrier 20 and the flange 15b of the turbine hub 15.

[Lock-Up Device 7]

The lock-up device 7 is a device for mechanically transmitting the torque from the front cover 2 to the turbine 4, and is disposed axially between the front cover 2 and the turbine 4.

The lock-up device 7 includes a pressure receiving portion 31 having an annular shape, a piston 32, a damper mechanism 33 provided as an input part, and a dynamic vibration absorber 34.

The annular pressure receiving portion 31 is disposed on the outer peripheral side of a torus (which is formed by the impeller and the turbine as a space of a flow pathway for the hydraulic oil and is provided as a fluid chamber) of the torque converter 1. In more detail, the pressure receiving portion 31 is formed by extending the outer peripheral end of the turbine shell 13 further radially outward. In other words, the pressure receiving portion 31 is formed by utilizing part of the turbine shell 13. Additionally, the pressure receiving portion 31 is disposed in opposition to the flat plate portion 10a of the impeller shell 10.

The piston 32 is disposed between the front cover 2 and the turbine 4 so as to be axially movable. The piston 32 includes a disc portion 32a, a friction portion 32b and a tubular portion 32c.

The disc portion 32a is shaped along the turbine shell 13 and the turbine hub 15.

The friction portion 32b, having an annular shape, is formed by extending the outer peripheral end of the disc portion 32a further radially outward. The friction portion 32b is disposed in opposition to the pressure receiving portion 31. A friction member 36, having an annular shape, is fixed to a surface of the friction portion 32b that is opposed to the pressure receiving portion 31. It should be noted that the friction member 36 can be fixed to the pressure receiving portion 31 side.

The tubular portion 32c is formed by bending the inner peripheral end of the disc portion 32a toward the front cover 2. The tubular portion 32c is slidably supported by the outer peripheral surface of the hub 8 fixed to the inner peripheral part of the front cover 2. A seal member 38 is provided on the outer peripheral surface of the hub 8, and seals between the inner peripheral surface of the tubular portion 32c of the piston 32 and the outer peripheral surface of the hub 8.

With the aforementioned configuration, the pressure receiving portion 31 of the turbine shell 13, the friction portion 32b of the piston 32 and the friction member 36 fixed to the friction portion 32b compose a clutch part 40.

Figure 3:
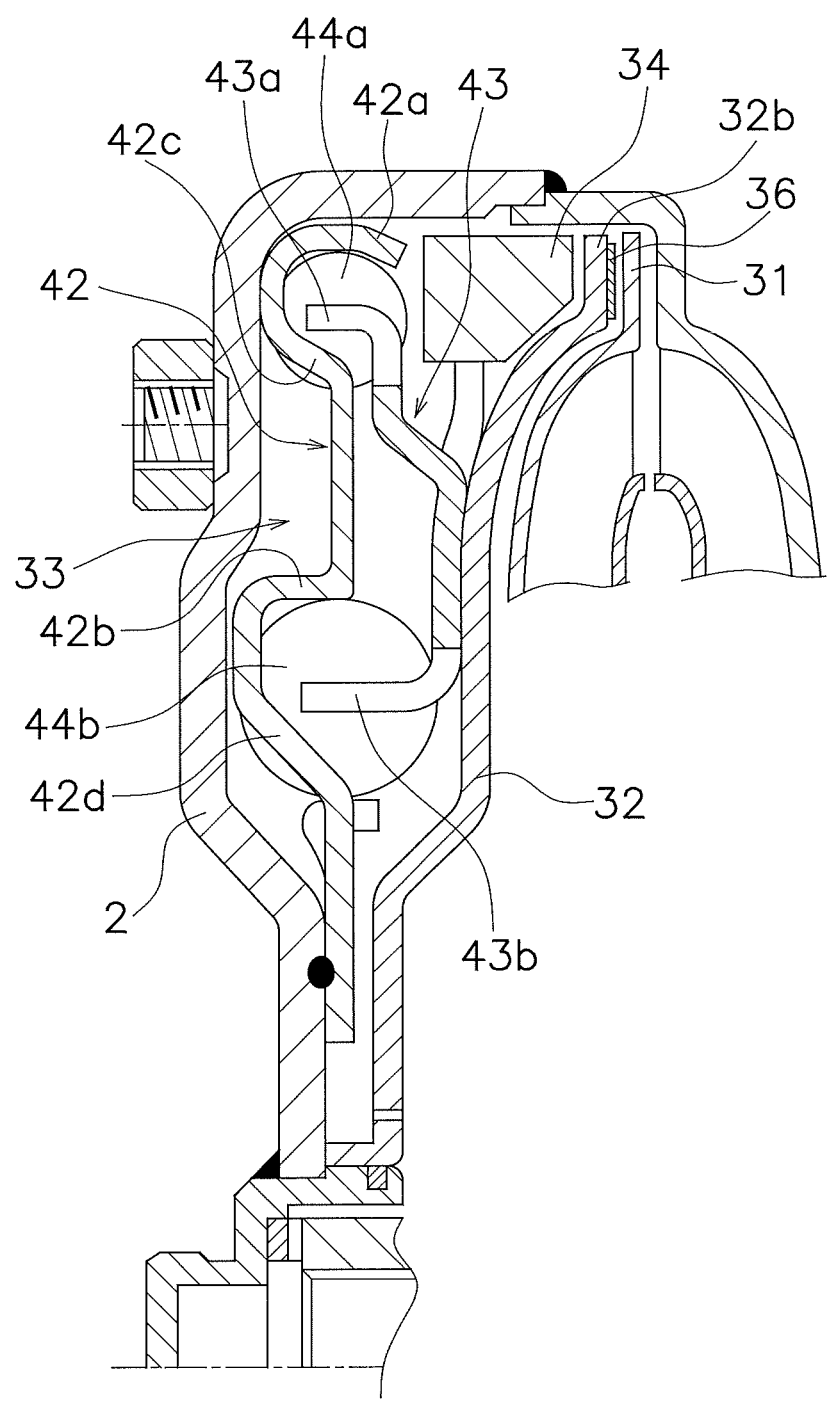
FIG. 3 is a diagram showing a damper mechanism extracted from FIG. 1.

As shown in FIG. 3, the damper mechanism 33 is disposed axially between the front cover 2 and the piston 32. The damper mechanism 33 includes a drive plate 42, a driven plate 43, a plurality of outer peripheral side torsion springs 44a and a plurality of inner peripheral side torsion springs 44b.

The drive plate 42 has a disc shape and is fixed at the inner peripheral part thereof to a lateral surface of the front cover 2 by welding. The drive plate 42 includes a plurality of outer peripheral side accommodation portions 42a, a plurality of inner peripheral side accommodation portions 42b, a plurality of outer peripheral side engaging portions 42c and a plurality of inner peripheral side engaging portions 42d.

The outer peripheral side accommodation portions 42a are provided at predetermined intervals in the circumferential direction, and the outer peripheral side torsion springs 44a are accommodated in the outer peripheral side accommodation portions 42a, respectively. Likewise, the inner peripheral side accommodation portions 42b are also provided at predetermined intervals in the circumferential direction, and the inner peripheral side torsion springs 44b are accommodated in the inner peripheral side accommodation portions 42b, respectively.

The outer peripheral side engaging portions 42c are disposed to be capable of being engaged with both ends of the outer peripheral side torsion springs 44a accommodated in the outer peripheral side accommodation portions 42a. On the other hand, the inner peripheral side engaging portions 42d are disposed to be capable of being engaged with both ends of the inner peripheral side torsion springs 44b accommodated in the inner peripheral side accommodation portions 42b.

The driven plate 43, having a disc shape, is fixed at the radially intermediate part thereof to the front cover 2—side surface of the piston 32 by welding. The driven plate 43 includes a plurality of outer peripheral side engaging portions 43a and a plurality of inner peripheral side engaging portions 43b. The outer peripheral side engaging portions 43a are formed by bending the outer peripheral end of the driven plate 43 toward the front cover 2. Additionally, the outer peripheral side engaging portions 43a are capable of being engaged with both ends of the outer peripheral side torsion springs 44a. On the other hand, the inner peripheral side engaging portions 43b are capable of being engaged with both ends of the inner peripheral side torsion springs 44b.

With the configuration described above, the torque inputted to the front cover 2 is transmitted to the piston 32 through the drive plate 42, the torsion springs 44a and 44b, and the driven plate 43.

The dynamic vibration absorber 34 is disposed axially between the friction portion 32b of the piston 32 and the outer peripheral side torsion springs 44a. The dynamic vibration absorber 34 is attached to the outer peripheral part of a portion of the driven plate 43. The dynamic vibration absorber 34 is a device inhibiting a phenomenon of resonance from occurring at around the frequency of normal mode of the lock-up device 7. As the dynamic vibration absorber 34, it is possible to employ suitable one of dynamic vibration absorbers having a variety of configurations such as a type of dynamic vibration absorber including an inertia ring and a spring, a type of dynamic vibration absorber including a pendulum and so forth. Detailed explanation of the configurations will be herein omitted.

[Hydraulic Circuit]

Figure 4:
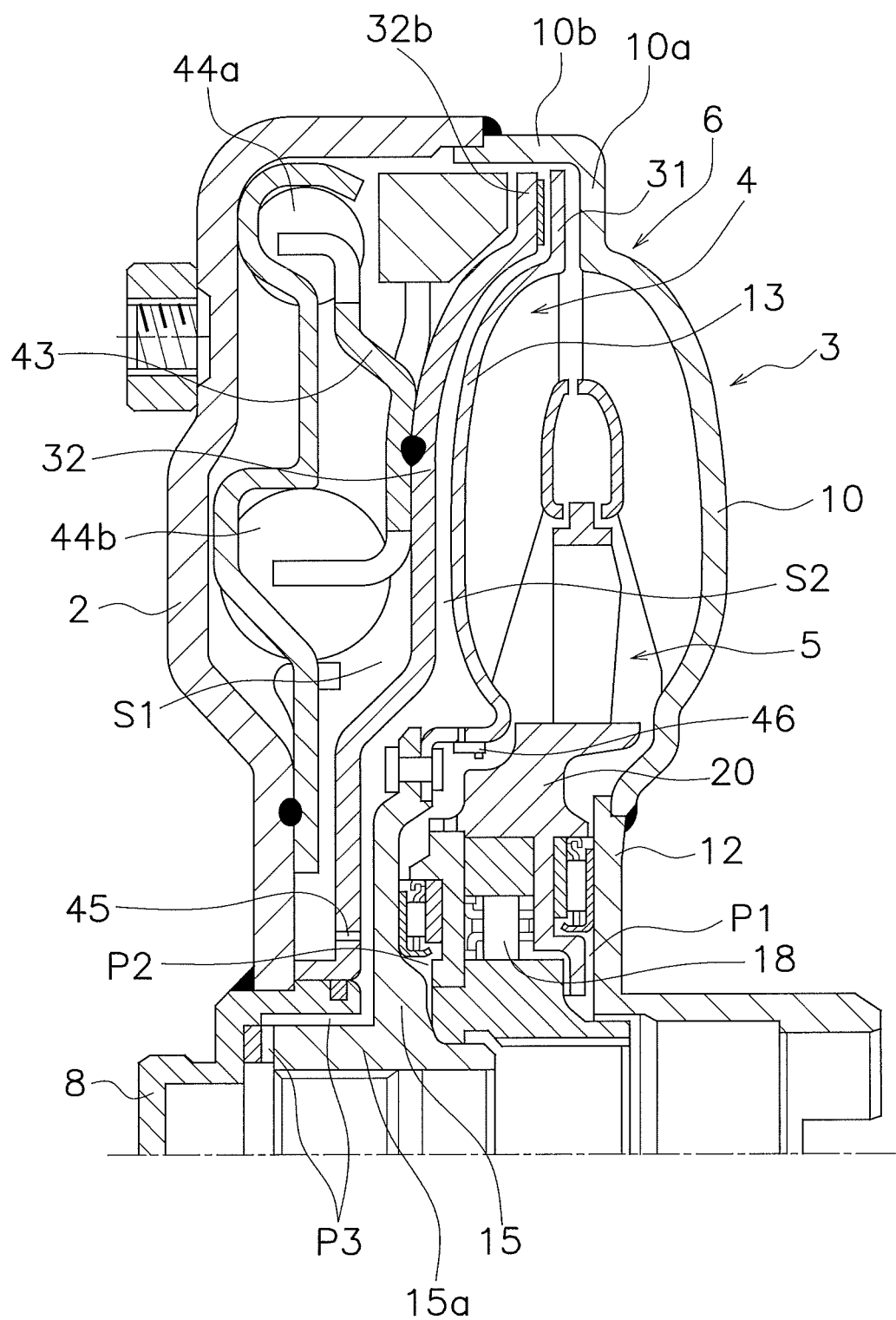
FIG. 4 is a diagram showing a hydraulic circuit of the torque converter shown in FIG. 1.

Next, a hydraulic circuit provided in the torque converter 1 will be explained with FIG. 4. The hydraulic circuit includes a first oil pathway P1, a second oil pathway P2, a third oil pathway P3, an orifice 45 and a check valve 46.

The first oil pathway P1 is provided between the impeller hub 12 and the stator carrier 20. The second oil pathway P2 is provided between the turbine hub 15 and the stator carrier 20. Also, the third oil pathway P3 is provided continuously from the in-between of the hub 8 and the distal end of the tubular portion 15a of the turbine hub 15 to the in-between of the hub 8 and the outer peripheral surface of the tubular portion 15a.

Additionally, the orifice 45 is provided in the inner peripheral part of the piston 32, and axially penetrates therethrough. The orifice 45 makes a first space S1 between the front cover 2 and the piston 32 and a second space S2 between the piston 32 and the turbine 4 communicate therethrough. In other words, the orifice 45 connects the first space S1 to the third oil pathway P3 through the second space S2.

The check valve 46 is mounted to the inner peripheral part of the turbine shell 13. The check valve 46 allows the hydraulic oil to flow from the second space S2 between the piston 32 and the turbine 4 to the interior of the fluid chamber, but prevents the hydraulic oil from flowing in the opposite direction to the allowed flow direction. In other words, when pressure is higher in the second space S2 located on the piston 32 side of the turbine 4 than in the interior of the fluid chamber, the check valve 46 is configured to be opened so as to lead the hydraulic oil from the second space S2 to the interior of the fluid chamber. It should be noted that the flow area of the check valve 46 is roughly set to be slightly larger than that of the orifice 45 in the piston 32. Because of this, even when the check valve 46 is opened, the leakage amount of hydraulic oil is small.

[Action]

In a torque converter actuation range that a torque is transmitted through the hydraulic oil, the hydraulic oil supplied through the third oil pathway P3 flows in a circulation channel of the second space S2, the interior of the fluid chamber, and the first oil pathway P1 and the second oil pathway P2 in this order. In this case, the torque inputted to the impeller 3 from the front cover 2 is outputted to the input shaft of the transmission through the turbine 4. Inside the torus, the hydraulic oil supplied to the turbine 4 is returned to the impeller 3 while the flow thereof is regulated by the stator 5.

In the aforementioned torque converter actuation range, the lock-up device 7 is kept in an off state (a state in which torque transmission is blocked). In this lock-up off state, the relation "the second space $S2$>the first space $S1$>the interior of the torus"

is established regarding magnitudes of hydraulic pressure in the respective locations. Therefore, the friction member 36 of the piston 32 is separated from the pressure receiving portion 31, whereby the torque, transmitted from the front cover 2 to the piston 32 through the damper mechanism 33, is not transmitted to the turbine 4.

It should be noted that hydraulic pressure is higher in the second space S2 than in the interior of the torus, whereby the check valve 46 is kept opened. However, the hydraulic oil is being supplied to the second space S2 through the third oil pathway. Hence, even in the opened state of the check valve 46, hydraulic pressure is higher in the second space S2 than in the first space S1. Additionally, due to the same reason, the hydraulic oil in the interior of the torus does not leak out from the turbine 4, and hence, deterioration in performance of the torque converter does not occur.

On the other hand, when a speed ratio becomes a predetermined value or greater, the lock-up device 7 is turned on, and the torque converter actuation range transitions to the lock-up state. In this switching from the lock-up off state to the lock-up on state, the flow of hydraulic oil does not occur. Additionally, in this switching, due to difference in rotational speed between the impeller and the turbine, the hydraulic oil flows fast when circulating in the interior of the torus, and hence, hydraulic pressure is low in the interior of the torus. Because of this, the check valve 46 is kept opened, and the relation "the first space $S1$>the second space $S2$=the interior of the torus"

is established regarding magnitudes of hydraulic pressure in the respective locations. Therefore, the piston 32 is quickly moved toward the pressure receiving portion 31, and good clutch responsiveness is obtained.

Then, when the lock-up on state is completely made, the hydraulic oil, supplied to the torus through the first and second oil pathways P1 and P2, flows therefrom and passes through the gap between the flat plate portion 10a of the impeller shell 10 and the pressure receiving portion 31 of the turbine shell 13. The hydraulic oil further flows along the inner peripheral surface of the tubular portion 10b of the impeller shell 10, and is supplied to the first space S1. Moreover, the hydraulic oil supplied to the first space S1 circulates through the orifice 45 and the third oil pathway P3.

In the lock-up on state described above, the relation

"the interior of the torus=the first space $S1$>the second space $S2$"

is established regarding magnitudes of hydraulic pressure in the respective locations. Therefore, the friction member 36 on the friction portion 32b of the piston 32 is pressed onto the pressure receiving portion 31.

Additionally, hydraulic pressure gets higher in the interior of the torus than in the second space S2. Hence, the check valve 46 is closed. Because of this, reduction in hydraulic pressure required for the lock-up on state does not occur.

Moreover, in the lock-up on state, the damper mechanism 33 and the dynamic vibration absorber 34 are actuated. Hence, fluctuations in torque to be transmitted to an output side can be inhibited, and fluctuations in peak torque attributed to resonance can be inhibited.

[Features]

(1) The clutch part 40 of the lock-up device 7 is composed of the friction portion 32b provided in the outer peripheral part of the piston 32 and the pressure receiving portion 31 provided in the outer peripheral end of the turbine 4. Therefore, the configuration thereof is made quite simple.

Additionally, the pressure receiving portion 31 is formed by utilizing part of the turbine shell 13. Hence, manufacturing cost can be reduced as much as possible.

(2) When the lock-up on state is made, it is only required to move the piston 32 and the driven plate 43, whereby responsiveness is enhanced in the lock-up on state. Additionally, the check valve 46 is provided that allows only the flow of hydraulic oil from the second space S2 located on the piston 32 side of the turbine 4 to the interior of the fluid chamber. Hence, when the lock-up on state is made, pressure can be quickly reduced in the second space S2. Because of this, clutch responsiveness is further enhanced.

(3) The clutch part 40 is provided on the further outer peripheral side of the outer peripheral end of the turbine. Hence, a large torque transmission capacity can be obtained with a small friction area.

(4) The outer peripheral side torsion springs 44a are disposed in the outer peripheral part of the space between the clutch part 40 and the front cover 2. Hence, each outer peripheral side torsion spring 44a can be increased in diameter and can be elongated in spring length, whereby it is possible to form a damper with sufficient torque transmission capacity and good vibration absorbing performance.

(5) The orifice 45 is provided such that the first space S1 located on the front cover 2 side of the piston 32 and the second space S2 located on the turbine 4 side of the piston 32 are communicated therethrough. Hence, the hydraulic oil in the first space S1 can be circulated through the orifice 45. Because of this, lubricating performance is enhanced.

Other Exemplary Embodiments

The present disclosure is not limited to the exemplary embodiment described above, and a variety of changes or modifications can be made without departing from the scope of the present disclosure.

Figure 5:
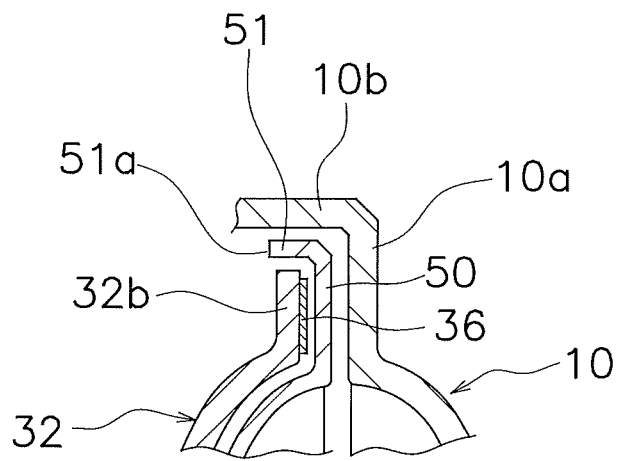
FIG. 5 is a partial cross-sectional view of a torque converter according to another exemplary embodiment of the present disclosure.

(a) FIG. 5 shows another exemplary embodiment of the present disclosure. FIG. 5 shows only the clutch part in FIG. 1. In the present exemplary embodiment shown in FIG. 5, a pressure receiving portion 50 is provided with a guide portion 51 having an annular shape in the outer peripheral part thereof. The annular guide portion 51 is a portion formed by bending the outer peripheral end of the pressure receiving portion 50 toward the front cover 2. The front cover-side distal end of the guide portion 51 axially extends on the outer peripheral side of the piston 32. In more detail, a distal end surface 51a of the guide portion 51 extends toward the front cover 2 across the outer peripheral surface of the piston 32 set in a neutral position (a position that the pressure of the hydraulic oil is not acting on the piston 32).

With the guide portion 51 provided as described above, when the lock-up on state is made, the hydraulic oil is reliably supplied from the interior of the torus to the first space S1 along the flow pathway between the inner peripheral surface of the tubular portion 10b of the impeller shell 10 and the outer peripheral surface of the guide portion 51. In other words, when the lock-up on state is made, the hydraulic oil can be inhibited from intruding into the second space S2 between the piston 32 and the turbine 4. Because of this, responsiveness can be further enhanced in the lock-up on state.

(b) In the aforementioned exemplary embodiment, the pressure receiving portion 31 is formed by utilizing part of the turbine shell 13. However, a different member from the turbine shell 13 can be provided as the pressure receiving portion.

(c) In the aforementioned exemplary embodiment, the friction portion 32b is formed by utilizing part of the piston 32. However, a different member from the piston 32 can be provided as the friction portion 32b.

(d) The aforementioned exemplary embodiment has exemplified a configuration that the dynamic vibration absorber 34 is attached to the driven plate 43. However, the position in which the dynamic vibration absorber 34 is attached is not limited to that in the aforementioned exemplary embodiment. Alternatively, the dynamic vibration absorber 34 might not be provided.

(e) In the aforementioned exemplary embodiment, the drive plate 42 is installed, while being fixed to the front cover 2 by welding. However, the drive plate can be omitted by proving the front cover 2 with portions in which the torsion springs 44 are accommodated and portions with which the torsion springs 44 are engaged.

(f) The position in which the check valve 46 is attached is not limited to that in the aforementioned exemplary embodiment.

INDUSTRIAL APPLICABILITY

According to the present disclosure, a lock-up device for a torque converter can be realized with a simple configuration, and a sufficient torque transmission capacity can be reliably obtained.

REFERENCE SIGNS LIST

1 Torque converter
2 Front cover
3 Impeller
4 Turbine
7 Lock-up device
13 Turbine shell
31, 50 Pressure receiving portions
32 Piston
32b Friction portion
33 Damper mechanism
34 Dynamic vibration absorber
42 Drive plate
42a, 42b Accommodation portions
42c, 42d Engaging portions
43 Driven plate
43a, 43b Engaging portions
44a, 44b Outer peripheral side and inner peripheral side torsion
springs
45 Orifice
46 Check valve
51 Guide portion

The invention claimed is:
1. A torque converter for transmitting a torque from a drive source to an input shaft of a transmission, the torque converter comprising:
a front cover to which the torque is inputted;
an impeller fixed at an outer peripheral part thereof to an outer peripheral part of the front cover, the impeller configured to form a fluid chamber together with the front cover;
a turbine opposed to the impeller, the turbine having a coupling portion at an inner peripheral part of the turbine to couple the turbine to the input shaft of the transmission; and
a lock-up device configured to mechanically transmit the torque from the front cover to the turbine, wherein
the lock-up device includes
a pressure receiving portion having an annular shape, the pressure receiving portion provided to protrude from an outer peripheral end of the turbine further radially outward,
a piston disposed between the front cover and the turbine so as to be axially movable, the piston including a friction portion in an outer peripheral part thereof, the friction portion configured to be engaged by friction with the pressure receiving portion of the turbine when pressed onto the pressure receiving portion, and
an input part configured to transmit the torque from the front cover to the piston, and
the piston is directly fixed to the input part.
2. The torque converter according to claim 1, wherein the turbine includes a turbine shell, and
the pressure receiving portion is formed by extending an outer peripheral end of the turbine shell radially outward.

3. The torque converter according to claim 1, further comprising:
a guide member having an annular shape, the guide member provided in an outer peripheral part of the pressure receiving portion, the guide member extending toward the front cover on an outer peripheral side of the piston, the guide member configured to lead a hydraulic oil supplied to an interior of the fluid chamber to a front cover side of the piston.

4. The torque converter according to claim 3, wherein the guide member extends at a distal end thereof toward the front cover across an outer peripheral surface of the piston set in a neutral position, the neutral position corresponding to a position of the piston not moved toward the pressure receiving portion.

5. The torque converter according to claim 4, wherein the guide member is formed by bending the outer peripheral part of the pressure receiving portion toward the front cover.

6. The torque converter according to claim 1, wherein the input part includes
a drive plate rotated in synchronization with the front cover,
a driven plate rotated in synchronization with the piston, and
a plurality of elastic members configured to elastically couple the drive plate and the driven plate in a rotational direction.

7. The torque converter according to claim 6, wherein
the drive plate is fixed to the front cover, the drive plate including a holding portion configured to hold the plurality of elastic members, and
the driven plate is fixed to the piston, the driven plate including an engaging portion engaged with the plurality of elastic members.

8. The torque converter according to claim 1, wherein the piston includes a communication hole making a space located on the front cover side of the piston and a space located on a turbine side of the piston.

9. The torque converter according to claim 8, wherein the communication hole is provided on a radially inner side of a torus formed by the impeller and the turbine.

10. The torque converter according to claim 3, further comprising:
a check valve mounted to the turbine, the check valve configured to allow only a flow of the hydraulic oil from a space located on a piston side of the turbine to a space located on an impeller side of the turbine.

11. The torque converter according to claim 1, further comprising:
a dynamic vibration absorber fixed to the piston.

* * * * *